United States Patent [19]

Ricks

[11] 4,072,787
[45] Feb. 7, 1978

[54] LAMINATED WALL TUBING

[75] Inventor: Earl C. Ricks, Huntsville, Ala.

[73] Assignee: The United States of America as represented by the Secretary of the Army, Washington, D.C.

[21] Appl. No.: 756,319

[22] Filed: Jan. 3, 1977

[51] Int. Cl.² .................... B23K 11/10; B23K 31/06; B32B 1/08; F16L 39/00

[52] U.S. Cl. .................... 428/594; 113/1 M; 113/116 UT; 113/116 W; 113/120 K; 156/272; 219/67; 219/61.1; 219/91.2; 228/151; 228/175; 228/184; 228/185; 228/189; 228/190; 428/36; 428/636

[58] Field of Search .......... 113/1 M, 116 UT, 116 W, 113/120 K; 228/151, 175, 184, 185, 189, 190; 219/59, 67, 91; 156/272; 428/36, 594, 636

[56] References Cited

U.S. PATENT DOCUMENTS

| | | | |
|---|---|---|---|
| 1,316,385 | 9/1919 | Murray et al. | 219/67 |
| 1,363,159 | 12/1920 | Murray et al. | 219/67 |
| 1,363,160 | 12/1920 | Murray et al. | 219/67 |
| 2,073,684 | 3/1937 | Coakley | 228/151 |
| 2,209,402 | 7/1940 | Kepler | 228/184 |
| 2,217,090 | 10/1940 | Zerbe | 228/184 |
| 2,489,802 | 11/1949 | Needham | 228/175 |
| 2,914,846 | 12/1959 | Baldus et al. | 228/185 |
| 3,337,711 | 8/1967 | Garscia | 228/175 |
| 3,598,156 | 8/1971 | Ulmer | 428/36 |
| 3,704,509 | 12/1972 | Yamauchi | 228/184 |

FOREIGN PATENT DOCUMENTS 3,332 of 1898 United Kingdom .............. 219/67

Primary Examiner—J.C. Cannon
Attorney, Agent, or Firm—Nathan Edelberg; Robert P. Gibson; Harold W. Hilton

[57] ABSTRACT

A large diameter rocket launch tube comprised of a pair of thin sheets which are rolled and positioned in concentric relation with the seams disposed in spaced (180°) relation. A pair of reinforcing weld strips are positioned inside the tube adjacent the seams, and a second pair of reinforcing strips are positioned inside the tube intermediate the first pair of strips. A bonding agent is spread on the inner tube and the tubes are assembled and spot welded prior to having the adhesive cured.

2 Claims, 1 Drawing Figure

U.S. Patent
Feb. 7, 1978
4,072,787
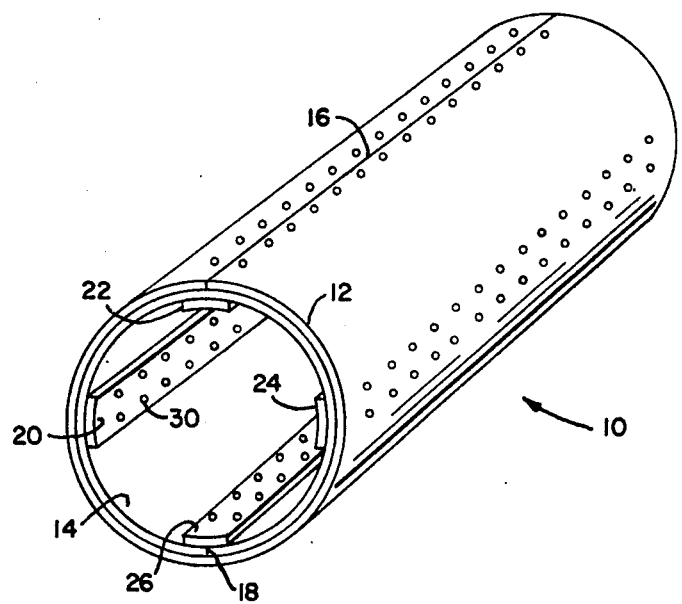

LAMINATED WALL TUBING

DEDICATORY CLAUSE

The invention described herein may be manufactured, used, and licensed by or for the Government for governmental purposes without the payment to me of any royalties thereon.

BACKGROUND OF THE INVENTION

Present day launch tubes requires a straightness and roundness very difficult to obtain. A particular launcher, for example, requires a tube 13.85 to 13.90 inches inside diameter and a wall thickness of 0.10 inches and straight within 0.012 inches per foot a 10 foot long tube. The thinnest wall tube that can be extruded in 13.90 inch diameter is 3/4 inch and the required straightness and quality cannot be met.

SUMMARY OF THE INVENTION

A launch tube comprised of a pair of sheets rolled in concentric relation with the seams spaced 180° apart. Weld reinforcing strips are provided in the inner tube and spaced 90° apart. Two of the weld reinforcing strips are adjacent the seams.

The thin pre-rolled sheets are formed over a mandrel having better than the required tube straightness and roundness. External pressure is applied through circomferential clamps. A bonding agent is applied between the sheets prior to clamping. Resistance welding is done 3 to 6 inches past the end of the mandrel, progressively sliding the tube off the mandrel and welding the newly exposed portion of the tube. The tube is welded in a pre-stressed load condition and will keep this shape. The bonding agent is cured between 200° F and 300° F for 2 to 3 hours.

BRIEF DESCRIPTION OF THE DRAWING

The single FIGURE is a pictorial drawing of the launch tube of the present invention.

DESCRIPTION OF THE PREFERRED EMBODIMENT

As seen in the FIGURE, a launch tube 10 includes a pair of thin metal sheets 12 and 14. Typically the sheets are of aluminum and are about 0.040 inches thick. The seams 16 and 18, respectively, of each tube are positioned 180° apart. Weld reinforcing strips 20, 22, 24 and 26 are positioned along the length of the tube and are spaced 90° apart with strips 22 and 26 adjacent seams 16 and 18, respectively.

Prior to placing the sheets in the rolled overlapping position an adhesive 28 is applied over the outside surface of the inner sheet and the inner surface of the outer sheet. The sheets are rolled as shown in the FIGURE, the welding reinforcing strips are positioned between a mandrel and the sheets. External clamps (not shown) are applied. As the rolled sheets are progressively slid off the mandrel resistance welding is done. The weld joints are indicated by the numeral 30. After welding the tubes, in pre-stressed condition, the bonding agent is cured between 200° F and 300° F.

I claim:

1. A laminated tubular structure comprising:
   a. first and second sheet members rolled in tubular concentric relation and positioned so that the seam of each rolled sheet is spaced 180° apart;
   b. bonding means disposed between said sheets; and
   c. reinforcing strips positioned in said second member, a first pair of reinforcing strips disposed adjacent said seams, a second pair of said reinforcing strips being spaced 90° from said first pair of reinforcing strips, said reinforcing strips and said sheet member being resistance welded along the length of said tubular structure.

2. A method of fabricating a tubular structure from a pair of flat members including the steps of:
   a. applying a bonding agent on adjacent surfaces of said sheets;
   b. rolling and positioning said members in concentric relation with the seams of said members being spaced 180° apart;
   c. positioning reinforcing members along the inside surface of the inner said flat member;
   d. clamping said rolled flat members and said reinforcing members about a mandrel;
   e. progressively moving the tubular structure off the mandrel while resistance welding the tubular structure along the length thereof; and,
   f. curing said bonding agent.

* * * * *